June 24, 1958  R. J. KAVANAUGH ET AL  2,840,773
MOTOR SPEED GOVERNOR

Filed March 25, 1957  3 Sheets-Sheet 1

INVENTORS
RICHARD J. KAVANAUGH
PHILIP W. KING
LOISIUS J. A. vanLIESHOUT
BY
ATTORNEYS June 24, 1958 R. J. KAVANAUGH ET AL 2,840,773
MOTOR SPEED GOVERNOR
Filed March 25, 1957 3 Sheets-Sheet 2
FIG. 3 FIG. 4 FIG. 5
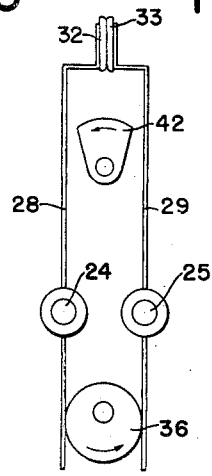
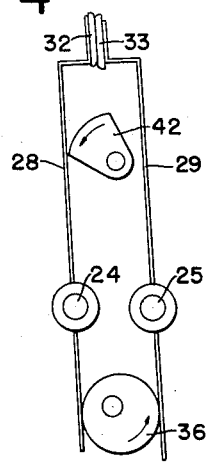
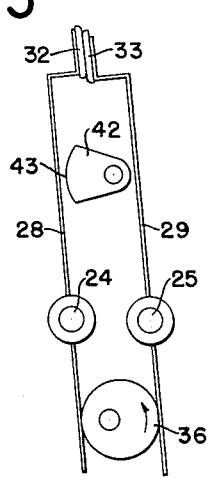
FIG. 6 FIG. 7 FIG. 8
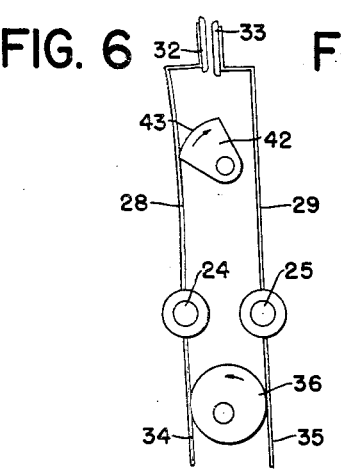
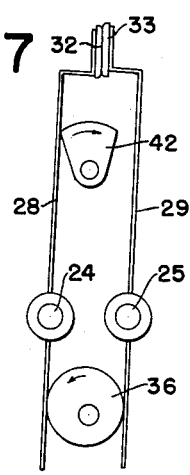
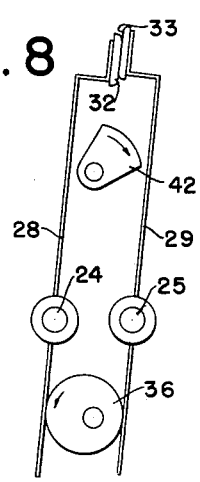
FIG. 9 FIG. 10 FIG. 11
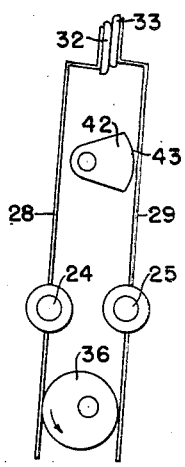
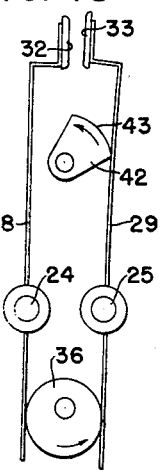
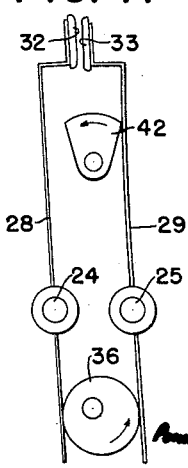
INVENTORS
RICHARD J. KAVANAUGH
PHILIP W. KING
LOISIUS J. A. vanLIESHOUT
BY
ATTORNEYS INVENTORS
RICHARD J. KAVANAUGH
PHILIP W. KING
LOISIUS J.A. van LIESHOUT
BY
ATTORNEYS

United States Patent Office 2,840,773
Patented June 24, 1958

2,840,773

MOTOR SPEED GOVERNOR

Richard J. Kavanaugh, Bristol, Philip W. King, Meriden, and Loisius J. A. van Lieshout, Bethlehem, Conn., assignors to Consolidated Electronics Industries Corp., Waterbury, Conn., a corporation of Delaware Application March 25, 1957, Serial No. 648,050

18 Claims. (Cl. 318—311)

This invention relates to speed governors for motors which exhibit a tendency to run at varying speeds depending upon the load thereon, changes or fluctuations in terminal voltage, etc. More particularly, the invention is concerned with motor speed governors of the type disclosed and claimed in prior United States Patents Nos. 2,523,298 and 2,740,080, the governor of this invention, however, constituting an improvement over the prior governor designs in that it is more suitable for miniaturization, may be manufactured at lower cost, and includes certain improved features resulting in substantially maintenance-free operation.

The new governor, the basic forms of which are described in the aforementioned prior patents, operates generally as follows:

A motor current supply source is employed from which a motor is supplied with sufficient current to tend to cause it to operate at a speed above a predetermined desired value. The motor aand current supply source are connected in a circuit which includes a pair of contacts adapted to be opened to terminate or reduce the supply of current to the motor and to be closed to apply full current to the motor. The governor includes a mechanical constant speed device for effecting the closing of the contacts at constant fixed intervals, independent of the instantaneous speed of the motor, when the motor is operating at or near the predetermined desired speed therefor. The governor also includes means, responsive to the operation of the motor at instantaneous speeds near the predetermined desired speed therefor, for opening the contacts between successive closings thereof and at instants determined by the travel of the motor.

One of the specific features of this invention is the provision of a motor speed governor operating on the principles set forth in the aforementioned prior patents which is capable of miniaturization in its physical embodiment, so as to be suitable for use in combination with an electric motor of very small size. Thus, although the scope of the invention is not limited by size alone, the new governor may be physically housed in a casing of three-quarters inch diameter, while at the same time effecting a simplification of components, as compared to earlier governor designs.

Another specific feature of the invention resides in the provision of an improved motor speed governor of the type and having the characteristics set forth above which may be manufactured at lower cost, and yet is dependable and maintenance-free in operation. Specifically, in this respect, the new governor includes switch contact means and contact actuating means of an improved and simplified type. The improved parts are economical to manufacture as assemble, and are so designed that the switch contacts are self-cleaning in operation.

For a better understanding of the invention, reference should be made to the following detailed description and accompanying drawings, in which:

Figs. 3–11 are simplified sequential representations of the new governor in operation;

Figure 1:
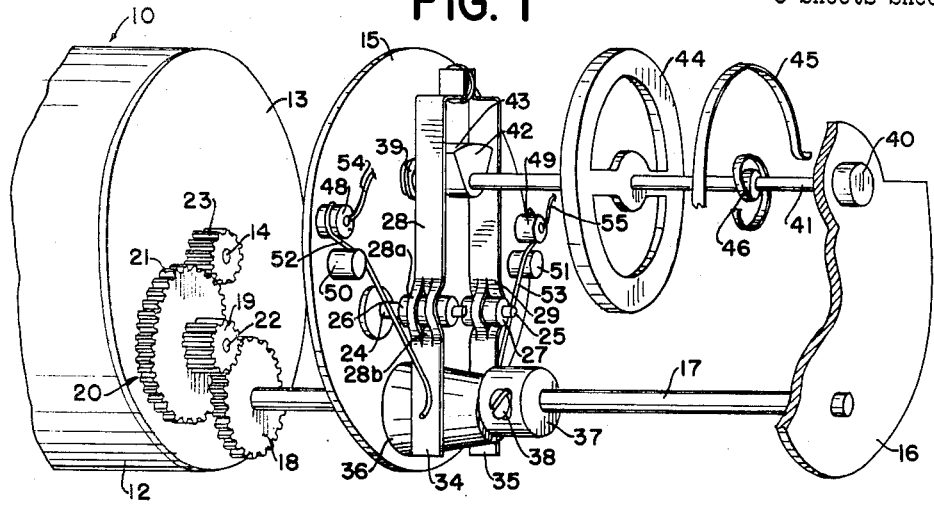
Fig. 1 is a perspective exploded representation of a motor speed governor incorporating the improved features of the invention.
Figure 2:
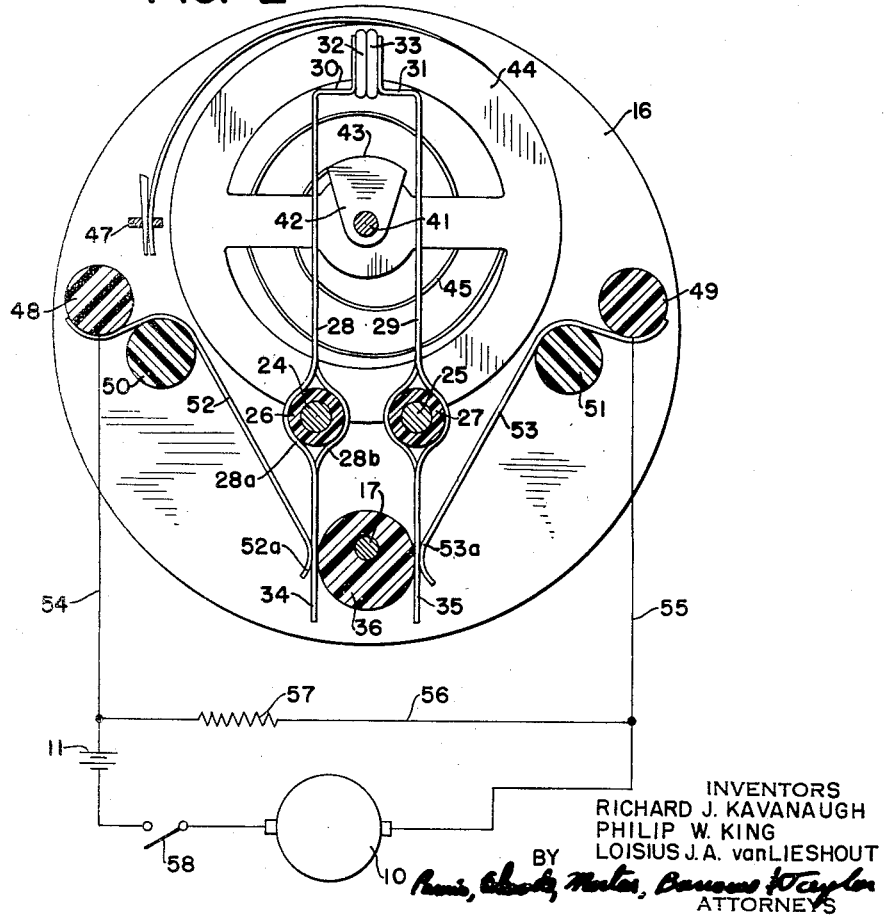
Fig. 2 is a transverse cross-sectional view of the governor of Fig. 1.

Referring now to the drawings, and initially to Figs. 1 and 2 thereof, the reference numeral 10 designates an electric motor, which may be of a conventional type, and is characterized by its tendency to operate at different speeds in response to variations in terminal voltage applied thereto or variations in the load imposed thereon. In its intended application, the motor 10 is supplied with electric current from a source 11 thereof, which may be either A. C. or D. C., and which has sufficient power, when connected directly across the terminals of the motor, to cause the motor to operate at a speed higher than a predetermined desired speed, under all normal conditions of load and voltage variation.

At one end of the casing 12 of the motor is a base plate 13, through which the rotor shaft 14 of the motor projects. Mounted in fixed relation to the base plate 13, but spaced forwardly therefrom, is an intermediate frame plate 15. An outer frame plate 16 is spaced forwardly of the intermediate frame plate, and secured in fixed relation thereto by any suitable means. Preferably, the base and frame plates 13, 15, 16 are of substantially the same diameter as the motor casing 12, so that the plates may be encased in a housing, not shown, of the same diameter as the motor casing.

Journaled in the frame plates 15, 16 is a shaft 17 which mounts a gear 18 at its inner or rearward end. The gear 18 meshes with the small pinion 19 of a differential gear set 20, including a large gear 21. The differential set 20 is mounted for rotation on the base plate 13, by means of a shaft 22, and the larger gear 21 of the set meshes with a drive pinion 23 mounted on the motor shaft 14. The arrangement is such that rotation of the motor shaft 14 drives the shaft 17 at a reduced speed.

Rigidly secured to the intermediate frame plate 15, and extending forwardly thereof, are stud posts 24, 25, upon which are mounted plastic insulator bushings 26, 27. The bushings 26, 27 are freely rotatable about their respective stud posts 24, 25, while being generally confined against axial movement thereon.

Mounted on the bushings 26, 27 are contact arms 28, 29, formed of electrically conductive resilient material, such as suitable copper alloy. Intermediate its end portions, each contact arm has integral longitudinal strip portions (as at 28a, 28b in Fig. 1) deformed in opposite directions from the plane of the arm to define a generally circular eye for receiving one of the insulated bushings 26, 27. Advantageously, the eye of each contact arm may be slightly smaller in diameter than the bushing on which the arm is mounted, so that the eye firmly grips the bushing.

As will be apparent in Fig. 1, the contact arms 28, 29 are formed of flat strips of material, and the upper portions 30, 31 of the arms are bent inwardly, toward each other, and then upwardly. Secured to the upwardly bent tips of the contact arms, in electrically conducting relation thereto, are contact pads 32, 33, which may be formed of an appropriate conductive material, such as a suitable silver alloy.

Advantageously, the spacing of the stud posts 24, 25, and the dimensions of the upper portions 30, 31 of the contact arms and the contact pads 32, 33 are such that when the arms 28, 29 are disposed in substantially parallel relation the pads 32, 33 are in flat contact with each other. This arrangement is illustrated clearly in Fig. 2, and it will be observed therein that lower portions 34, 35 of the arms 28, 29 extend below the stud posts 24, 25 in generally parallel relation.

Figure 17:
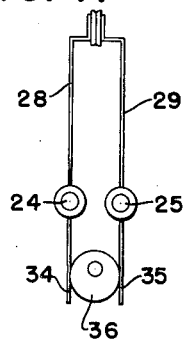
Figs. 17 and 18 are simplified representations of switch contact means and adjusting means therefor, as incorporated in the new governor.
Figure 18:
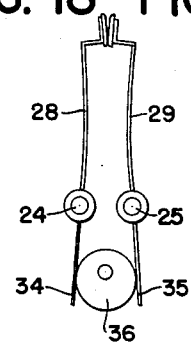

In the illustrated form of the invention, the stud posts 24, 25 are so positioned with respect to the motor driven shaft 17 that the lower portions 34, 35 of the contact arms are spaced from the shaft 17 on opposite sides thereof; and, as will be observed in Fig. 2, when the contact arms are in centered or neutral positions, the lower portions 34, 35 are symmetrically disposed with respect to the motor driven shaft 17. Affixed to the shaft 17, for rotation therewith, is an eccentric or cam member 36, formed of plastic or other non-conductive material. The cam 36 is circular in cross-section, but is eccentrically mounted on the shaft 17 whereby to act as a cam when the shaft is rotated. In accordance with the invention, the cam 36 is tapered longitudinally and, in the illustrated apparatus, the cam is of greater diameter at its inner end. Means such as an integral collar 37 and set screw 38 are provided for adjustably securing the cam in various points longitudinally of the motor driven shaft 17. The forward end of the cam 36 has a diameter which is somewhat less than the normal spacing between the lower portions 34, 35 of the contact arms when the contact pads 32, 33 are in contacting relation, while the inner or rearward end of the cam has a diameter which is somewhat larger than the normal spacing between the contact arm portions 34, 35. Thus, by adjusting the position of the cam 36 longitudinally of the shaft 17 and contact arms 28, 29 the lower portions 34, 35 of the contact arms may be urged outwardly to press the contact pads 32, 33 together with a desired force. This arrangement is represented in Figs. 17 and 18. In Fig. 17 the cam 36 is adjusted so that the contact pads 32, 33 are just touching, and no appreciable outward force is applied to the contact arm portions 34, 35. In Fig. 18, which is exaggerated for purposes of illustration, the cam 36 has been shifted forwardly so that a larger diameter portion thereof bears against the arm portions 34, 35, pressing the arm portions outwardly and causing the contact pads 32, 33 to be pressed together with substantial force. The upper portions of the contact arms may be bowed a slight amount so that the contact pads 32, 33 are maintained in resilient engagement, but the bowing is not so great as to prevent the contact pads from being in flat contacting relation with each other.

Journaled in suitable bearings 39, 40 on frame plates 15, 16 (see Fig. 1), is a balance wheel shaft 41 which extends between the upper portions of contact arms 28, 29, the contact arms being symmetrically disposed with respect to the balance wheel shaft when the arms are in a centered or neutral position. Mounted adjacent the inner end of the shaft, and positioned directly between the upper portions of contact arms 28, 29, is a cam 42 having an active outer surface portion 43 constituting a segment of a circle and covering an arc in the order of sixty degrees. The radius of the active cam surface 43 is somewhat greater than the normal spacing between the contact arms 28, 29 and the axis of the balance wheel shaft 41, as will be observed in Fig. 2.

Also mounted on the balance wheel shaft 41, forwardly of the cam 42, is a balance wheel 44, which may be of the type commonly incorporated in mechanical timepieces. Acting in conjunction with the balance wheel 44 is a coiled hairspring 45, one end of which is secured to the shaft 41, as at 46, in Fig. 1, and the other end of which is secured to the frame plate 16, as at 47 in Fig. 2. In accordance with well-known principles, if the balance wheel 44 is rotationally displaced it will tend to oscillate back and forth at a definite frequency determined by the characteristics of the balance wheel 44 and hairspring 45.

Mounted on the intermediate frame plate 15, and projecting forwardly therefrom, are pairs of posts 48—51, formed of plastic or other insulating material and positioned in symmetrical relation to the motor driven and balance wheel shafts 17, 41. A pair of spring elements 52, 53 are mounted on the posts 48—51 and have curved end portions 52a, 53a which bear inward resiliently upon the lower portions 34, 35 of the contact arms to urge them against the cam 36. As shown in Fig. 2, the spring elements 52, 53 are of a simplified form, and have upper end portions bent to extend around the top portions of posts 50, 51 and hook under the bottom portions of posts 48, 49. If desired, suitable grooves or recesses (not shown) may be provided in the posts 48—51 to receive the spring elements 52, 53 and hold them in desired positions.

Advantageously, the spring elements 52, 53 are formed of resilient, electrically conductive wire or strip material, so as to be in electrically conductive relation to the primary contact arms 28, 29. Accordingly, circuit conductors 54, 55 may be connected to the spring elements at or adjacent their upper ends for supplying current to the lower portions 34, 35 of the contact arms 28, 29.

In the schematic circuit illustrated in Fig. 2, the motor 10 is placed in series with power source 11 through two parallel current paths. A first current path includes conductors 54, 55, conductive spring elements 52, 53, and contact arms 28, 29. A second circuit includes conductor 56 and a resistance element 57, which advantageously has a resistance value substantially equivalent to that of the motor 10. When the contacts 32, 33 are in closed or contacting relation, the power source 11 is connected directly to the terminals of the motor 10, and, in accordance with the stipulated relationship between the power source and motor, the motor will at such times tend to operate at a speed greater than the predetermined desired speed, regardless of such variations in terminal voltage and motor load as may be expected in normal service. When the contacts 32, 33 are open, the power source 11 is connected to the motor 10 only through the resistance element 57, so that the power supplied to the motor is insufficient to cause the motor to operate at the predetermined desired speed under all normal conditions. In some cases, the second or bypass circuit including a conductor 56 and resistance element 57 may be eliminated, so that opening of the contacts 32, 33 fully disconnects the power source from the motor. However, the bypass circuit is desirable to reduce arcing at the contacts 32, 33, and to provide greater uniformity in the operation of the motor 10.

As will be more fully described, when the motor 10 is at rest, the contact pads 32, 33 are at all times in closed or contacting relation. Accordingly, when the power source 11 is connected to the motor 10, as by closing switch 58, full power will be applied to the motor, causing it to accelerate as quickly as possible. As the shaft 14 of the motor rotates, it will act through the train of gears 23, 21, 19, 18 to drive the shaft 17 at a reduced speed. Rotation of the motor driven shaft 17 will effect rotation of the cam 36, and will thereby cause the lower portions 34, 35 of the contact arms to be urged from side to side, as the axis of eccentricity of the cam moves through each complete revolution. It will be observed, in this respect, that the spacing between the contact arm portions 34, 35 is not changed at any time by the cam 36, since the cam has a circular cross-section. Rather, the contact arm portions 34, 35 are merely displaced from side to side, in unison, to cause the contact arms to pivot about the stud posts 24, 25.

Normally, since the longitudinal adjustment of the tapered cam 36 is such as to apply a slight pressure between the contact pads 32, 33 the arm portions 34, 35 of the contact arms will closely follow the surface of the cam 36, even when the cam surface is tending to recede from the contact arm. Thus, assuming that the cam 36 rotates in a counter-clockwise direction, starting from the neutral position shown in Fig. 2, cam 36 will urge the lower portion 35 of contact arm 29 outwardly, pivoting the arm 29 counter-clockwise about the stud post 25. At the same time, the contact pad 33 pushes against the contact pad 32 to pivot the second contact arm 28 in a counter-clockwise direction and maintain the lower portion 34 thereof in proper contact with the cam 36. It will thus be observed that if the contact arms 28, 29 are acted upon only by the cam 36, rotation of the cam will merely cause the contact arms to be displaced from side to side during each revolution of the cam, but will not cause the contacts to be opened.

Figure 14:
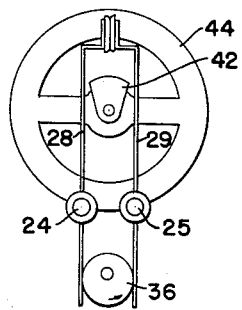
Figs. 14–16 are simplified sequential representations of the new governor, illustrating the manner in which it is brought into operation.
Figure 15:
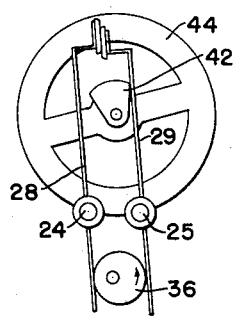
Figure 16:
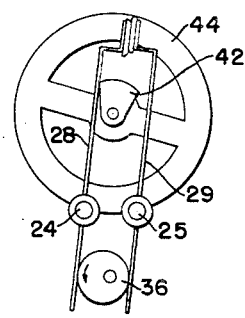

Referring now to Figs. 14–16, when power is first applied to motor 10, the cam 36 being in a neutral position as illustrated in Fig. 14, the initial ninety degrees of rotation of the cam will displace the upper portions of contact arms 28, 29 to the left. As this occurs, the right-hand contact arm will strike the balance wheel cam 42, displacing it slightly to the left, as shown in Fig. 15. An additional one hundred-eighty degrees of counter-clockwise rotation of the cam 36 will displace the upper portions of contact arms 28, 29 to the right, causing the arm 28 to strike the balance wheel cam 42 from the left and displace it to the right, as shown in Fig. 16. Accordingly, as cam 36 is rotated during the initial acceleration of the motor 10 a series of force impulses will be imparted to the balance wheel cam 42 to set the balance wheel system in motion. Once set in motion, the balance wheel system will oscillate at a constant speed or definite frequency. The system is kept in motion by periodical force impulses imparted thereto by the oscillating contact arms 28, 29. However, as will be understood, the frequency of oscillation of the balance wheel system will remain constant and independent of such force impulses, provided only that the periodic impulses are sufficient to overcome the frictional forces acting upon the balance wheel system, which would otherwise eventually bring the system to a complete stop.

In accordance with the disclosures in prior Patents Nos. 2,523,298 and 2,740,080, the governor device functions in such a manner as to cause the contact arms 28, 29 to oscillate back and forth at the frequency at which the balance wheel system oscillates. Thus, by way of example only, it may be desirable to employ an 1,800 beat balance wheel system (900 complete oscillations per minute) for governing the motor 10 for operation at 4,500 R. P. M., where the gear system 18—23 effects a speed reduction of five to one (5:1). In the example system, the cam 36 will rotate at 900 R. P. M. when the motor is operating at its predetermined desired speed of 4,500 R. P. M., so that the cam 36 will make one complete revolution for each complete oscillation of the balance wheel system.

The operation of the new governor is represented in the sequential views in Figs. 3–11. Assuming that the motor has accelerated to the predetermined desired speed, and the axis of eccentricity of the cam 36 is instantaneously directed downward and the balance wheel cam 42 is instantaneously in a neutral or upward position, rotation of the cam 36 in a counter-clockwise direction will deflect the upper portions of the contact arms 28, 29 to the left, while at the same time the balance wheel cam 42, rotating counter-clockwise, swings toward the left. This initial phase of operation is illustrated in Figs. 3 and 4. The physical configuration of the contact arms 28, 29 and balance wheel cam 42 is such that if the contact arms 28, 29 were to oscillate in exact synchronism with the balance wheel cam 42 the arms and cam would never touch. However, since the power source 11 tends to drive the motor 10 and cam 36 at a speed greater than the predetermined desired speed, the contact arms 28, 29 will tend to oscillate at a greater frequency than the balance wheel cam 42. Thus, as shown in Figs. 5 and 6, when the cam 36 has moved to a point where the contact arms 28, 29 have completed their movement to the left and are returning toward the right the contact arm 28 engages the active surface 43 of the balance wheel cam 42 and is restrained thereby. As the cam 36 continues to rotate in a counter-clockwise direction the lower portion 34 of contact arm 28 will be urged outwardly. This bows the contact arm 28 slightly but does not effect movement of the upper portion thereof, which is restrained by the cam 42. However, at this same time the active surface of the cam 36 tends to recede from the lower portion 35 of the opposite contact arm 29, and the arm is caused to pivot in a clockwise direction under the resilient urging of the spring element 53, which maintains the contact arm portion 35 in engagement with the cam 36. Accordingly, the contact pads 32, 33 will be opened, as shown in Fig. 6.

Since the active surface 43 of the balance wheel cam 42 is substantially circular in form, the balance wheel cam will continue to rotate, even when in restraining engagement with the contact arm 28. Accordingly, when the cam 42 reaches a substantially upright position contact arm 28 will be released and permitted to spring to the right, closing contacts 32, 33. As the contact arm 28 springs to the right it acts against a corner portion of the balance wheel cam 42, imparting a small force impulse thereto tending to keep the balance wheel system in motion.

During the short interval of time during which the contact pads 32, 33 are open, the motor 10 tends to slow down to a speed below the predetermined desired speed. However, when the contacts are permitted to close, as in Fig. 7, the motor 10 and cam 36 will again accelerate, so that the contacts arms 28, 29 will oscillate to the right at a speed somewhat greater than the balance wheel cam 42. Figs. 8 and 9 illustrate this portion of the governor cycle.

After the cam 36 has rotated to a point where the contact arms 28, 29 begin to return in a counter-clockwise direction, or to the left, the contact arm 29 will be engaged and restrained by the active surface 43 of the balance wheel cam 42, and the contact pads 32, 33 will again be opened, spring element 52 acting to urge the contact pad 32 away from contact pad 33 as the cam 36 continues to rotate.

Of course, the balance wheel system continues to oscillate at its preset constant frequency, substantially regardless of the instantaneous speeds of the motor 10 and cam 36, and when the balance wheel cam 42 returns to a substantially vertical position, as shown in Fig. 11, the contact pads 32, 33 are permitted to reclose, and an additional force impulse is imparted to the cam 42. Thus, it will be understood that in each half cycle of operation of the governor the contacts 32, 33 will be permitted to close at a definite time, i. e., when the balance wheel cam 42 is in a substantially vertical position, as shown in Figs. 7 and 11. At a later time each half cycle period of operation the contacts will again be opened, and the period of time during which the contacts are closed depends on the instantaneous speed of the motor 10. If the motor load and terminal voltage conditions are such that the motor 10 tends to operate at a speed substantially greater than the predetermined desired speed, the contacts 32, 33 will be closed for a relatively brief interval during each half cycle period. However, where conditions are such that the motor 10 tends to operate at a speed only slightly greater than the predetermined desired speed the contacts will remain closed for a longer period of time.

When the motor 10 is disconnected from the source 11, as by opening of the switch 58, the governor mechanism will come to rest with the contacts 32, 33 closed under all circumstances. Thus, it has been explained that mere rotation of the cam 36 is ineffective to open the contacts 32, 33. Likewise, the power of the balance wheel system is not such as to enable the cam 42 to force the contacts open. Accordingly, when the cam 36 stops rotating it is impossible for the contacts to be opened by the balance wheel cam 42 alone. However, there is always sufficient impetus in the balance wheel system to rotate the cam 42 out of contact arm restraining position when the cam 36 is slowed down and brought to a stop. This is a highly desirable condition, of course, since when the switch 58 is again closed to energize the motor 10 full power from the source 11 will be applied to the terminals of the motor to accelerate the motor to speed as quickly as possible. Occasionally, the switch contacts may become fouled or contaminated. However, in such cases, the motor 10 will start through the circuit including a resistance element 57, and a wiping of the contact surfaces is effected in a manner to be described, effecting a cleaning of the contacts and bringing the governor into normal operation.

Figure 19:
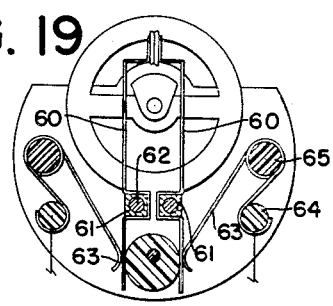
Fig. 19 is a fragmentary transverse cross-sectional view of an alternative form of the invention.

In the alternative form of the invention shown in Fig. 19, the contact arms 60, formed of wire or strip material, are carried by metallic bushings 61 pivoted on metallic pins 62, the pins 62 being offset inwardly somewhat from the principal axes of the contact arms 60. Metallic bushings 61, as distinguished from the plastic bushings 26, 27 on the first described embodiment, are desirable in certain instances, in that it is easier to maintain close dimensional tolerances. Of course, where metallic bushings and pins are employed, suitable means are provided for insulating the contact arms 60 from each other. This may be conveniently accomplished by forming the frame plate which mounts the pins 62 (corresponding to plate 15) of a suitable insulating material.

A further modified feature of the alternative apparatus of Fig. 19 is provision of modified spring elements 63, which are anchored by posts 64, wrapped around posts 65 and brought to bear resiliently upon the contact arms 60 opposite the motor driven cam 66. The modified form of spring is desirable in certain cases for maintaining spring pressure on the contact arms substantially constant at all times.

Figure 12:
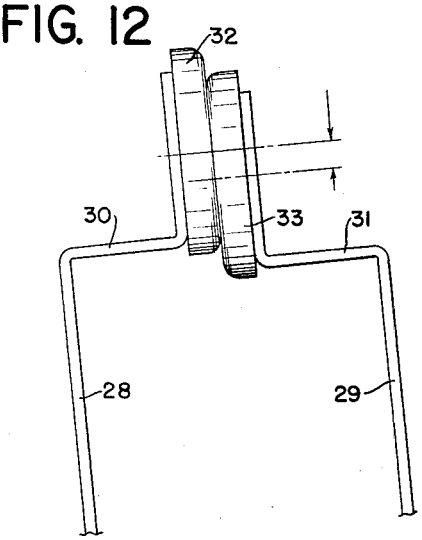
Figs. 12–13 are enlarged fragmentary views of switch contact members incorporated in the new governor.
Figure 13:
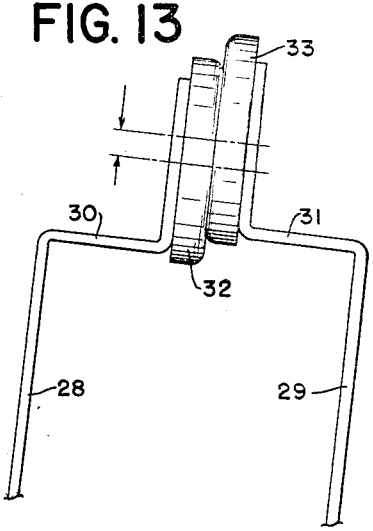

One of the important features of the invention resides in the structure of the contact arms 28, 29 and the supports 24, 25 therefor, whereby as the contact arms are pivoted back and forth during operation of the governor the contact pads 32, 33 wipe or slide with respect to each other at all times when the contacts are closed. Thus, as illustrated in Figs. 12 and 13, when the contact arms are deflected to the left, the center of contact pad 33 is considerably below that of contact pad 32. When the contact arms 28, 29 are deflected to the right the center of pad 33 is a similar distance above the center of contact pad 32. Accordingly, during each complete cycle of the governor the contact pads 32, 33 slide across each other twice (once in each direction) a distance equal to twice the center-to-center offset indicated in Figs. 12 and 13. In a preferred physical embodiment of the invention, where the entire governor mechanism is housed within a casing approximately three-quarters inch in diameter, approximately fifteen-thousandths inch of contact wipe occurs twice for every revolution of the eccentric, when the contacts are closed.

The new governor incorporates several new and improved structural features providing a highly compact and economical unit. The contact arms 28, 29 of the governor may be formed of spring strip material and are pivotally mounted between their ends in symmetrical relation to the circular frame plate in a manner such that the diameter of the frameplate need not be substantially greater than the length of the contact arms. The contact arms and the support means therefor do not require a great precision in their manufacture, since the tapered cam member 36 located between the lower portions of the contact arms may be readily adjusted longitudinally of the motor driven shaft 17 to bring the upper ends of the contact arms into the desired pressure contact.

As will be apparent in Fig. 2, the primary components of the governor mechanism are held in place by simple, economically manufactured stud posts. This is advantageous in that the stud posts occupy little space permitting of the desired compact assembly.

One of the advantageous operational features of the new governor resides in the orientation of the motor driven cam, contact arm supports and balance wheel cam. Thus, the motor driven cam 36 engages the contact arms near their lower ends, below the pivot supports, while the balance wheel cam 42 acts on the upper portions of the contact arms, above the pivot supports. This arrangement permits of simpler and more compact mountings for the contact arms, and also provides for the desired wiping action between the contact pads 32, 33.

It should be understood, however, that the specific governor device illustrated and described herein is intended to be representative only, as certain changes may be made therein without departing from the clear teachings of the invention. Assordingly, reference should be made to the following appended claims in determining the full scope of the invention.

We claim:

1. In a governor for a variable speed motor and of the type including an electric circuit for supplying sufficient current to the motor to tend to cause the motor to operate at a speed above a predetermined value, a pair of contact elements in said circuit, motor driven means acting on said contact elements, and a constant speed means acting on said contact elements, said motor driven and constant speed means cooperating with one another while said motor is operating near said predetermined value to cause said contact elements to close at instants dependent upon the speed of said constant speed means and for durations dependent upon the speed of said motor; the improvement comprising a frame associated with said motor, said contact elements comprising a pair of contact arms mounted for pivotal movement on said frame about spaced axes intermediate the ends of the contact arms, said contact arms having contact means adjacent first ends thereof adapted when closed to complete a current path through said contact arms, said constant speed means comprising cam means supported by said frame adjacent one pair of adjacent ends of said contact arms and adapted to engage said arms, said motor driven means comprising cam means supported by said frame adjacent the other pair of adjacent ends of said contact arms and adapted when rotated to tend to effect pivotal movement of said contact arms substantially in unison about their respective spaced axes, said motor driven and constant speed cam means being positioned on opposite sides of said axes.

2. A governor according to claim 1, in which said contact arms are formed of resilient electrically conductive material, and said motor driven cam means is generally circular in cross-section and has an effective diameter greater than the normal spacing between the second ends of said contact arms whereby to normally urge said contact means resiliently into contacting relation.

3. A governor according to claim 1, in which said motor driven cam means comprises a cam tapered in a direction longitudinal of its axis of rotation and the cam is adjustable in said direction, whereby the camming effect of said motor driven cam means may be varied.

4. A governor according to claim 1, in which said motor driven cam means acts in one direction on each of said contact arms, and spring means are provided for urging said contact arms in opposite directions.

5. A governor according to claim 4, in which said motor driven cam means comprises a cam of generally circular form positioned between the second ends of said contact arms, and said spring means act upon said contact arms to urge them toward said motor driven cam means.

6. A governor according to claim 5, in which said motor driven cam means has an effective diameter greater than the normal space between the second ends of said contact arms whereby said contact arms are normally held in contact with said motor driven cam means independently of said spring means.

7. A governor according to claim 4, in which said spring means are saparate spring elements acting independently upon said contact arms, and said spring elements are formed of electrically conductive material and form current paths for connecting said contact arms in circuit with said power source.

8. A governor according to claim 1, in which said contact arms are formed of flat resilient strip material and have integral longitudinal portions intermediate their ends deformed in opposite directions to define generally circular eye portions the axes of which are parallel to the planes of said strip material, and means carried by said frame project their said eye portions for pivotally mounting said contact arms.

9. In a governor for a variable speed motor and of the type including an electric circuit for supplying sufficient current to the motor to tend to cause the motor to operate at a speed above a predetermined value, a pair of contact elements in said circuit, motor driven means acting on said contact elements, and a constant speed means acting on said contact elements, said motor driven and constant speed means cooperating with one another while said motor is operating near said predetermined value to cause said contact elements to close at instants dependent upon the speed of said constant speed means and for durations dependent upon the speed of said motor; the improvement comprising a frame associated with said motor, said contact elements comprising a pair of contact arms mounted for pivotal movement on said frame, said contact arms having contact means adjacent free end portions thereof adapted when closed to complete a current path through said contact arms, said constant speed means comprising cam means supported by said frame and adapted to engage said contact arms, said motor driven means comprising cam means supported by said frame and adapted when rotated to tend to effect pivotal movement of said arms substantially in unison about their respective spaced axes, and means including the motor driven cam means operative to urge said contact arms in a direction tending to close said contact means.

10. A governor according to claim 9, in which said contact arms are formed of resilient material, and said contact means are normally resiliently held in a closed position by forces exerted on said contact arms by said cam means.

11. A governor according to claim 10, in which the forces exerted by said cam means act in one direction only on each contact arm, and spring means are provided for exerting forces in the opposite direction on each of said contact arms.

12. A governor according to claim 11, in which said spring means are electrically conductive elements contacting said contact arms and providing current paths for connecting said contact arms in circuit with said power source.

13. A governor according to claim 9, in which said contact arms are formed of flat strip material and have integral longitudinal portions deformed in opposite directions to define generally circular eye portions the axes of which are parallel to the planes of said strip material, bushings of insulating material are received in and frictionally gripped by said eye portions, and stud posts project from said frame for receiving said bushings.

14. In a governor for a variable speed motor and of the type including an electric circuit for supplying sufficient current to the motor to tend to cause the motor to operate at a speed above a predetermined value, a pair of contact elements in said circuit, motor driven means acting on said contact elements, constant speed means acting on said contact elements, said motor driven and constant speed means cooperating with one another while said motor is operating near said predetermined value to cause said contact elements to close at instants dependent upon the speed of said constant speed means and for durations dependent upon the speed of said motor; the improvement comprising a frame associated with said motor, said contact elements comprising a pair of contact arms mounted for pivotal movement on said frame, said contact arms having contact means adapted when closed to complete a current path through said contact arms, said constant speed means comprising cam means supported by said frame and adapted to engage said contact arms, said motor driven means comprising cam means supported by said frame and adapted when rotated to tend to effect pivotal movement of said arms, and separate spring elements acting on said contact arms continuously to urge said contact arms into operative relation to said motor driven cam means.

15. A governor according to claim 14, in which said contacts are mounted for pivotal movement about spaced axes, said contact means comprise pads of electrically conductive material spaced from said axes and normally contacting each other in flat relation, and said motor driven cam means are adapted when rotated to tend to cause said contact arms to pivot in unison about said spaced axes whereby to effect a wiping action between the opposed surfaces of said pads.

16. A governor according to claim 14, in which said spring elements are formed of electrically conductive material and are continuously in engagement with said contact arms whereby to provide current paths for connecting said contact arms in circuit with said power source.

17. A governor according to claim 14, in which said motor driven cam means is a cam of generally circular cross-section and tapered in a direction longitudinal of its axis of rotation, and means are provided for adjusting the position of said cam in said direction whereby to adjust the operative effect of said cam on said contact arms.

18. A governor according to claim 14, in which said contact arms have spaced portions, said motor driven cam means comprising a cam of generally circular cross-section positioned between and normally contacting said spaced portions and operative upon rotation to tend to pivot said contact arms substantially in unison.

No references cited.

UNITED STATES PATENT OFFICE

CERTIFICATE OF CORRECTION

Patent No. 2,840,773                                           June 24, 1958

Richard J. Kavanaugh et al.

It is hereby certified that error appears in the printed specification of the above numbered patent requiring correction and that the said Letters Patent should read as corrected below.

Column 1, line 33, for "aand" read -- and --; line 69, for "as" read -- and --; column 7, line 39, for "on the first" read -- of the first --; column 8, line 37, for "Assordingly" read -- Accordingly --; column 9, line 22, for "saparate" read -- separate --; line 34, for "their" read -- through --.

Signed and sealed this 9th day of September 1958.

(SEAL)
Attest:

KARL H. AXLINE                                              ROBERT C. WATSON

Attesting Officer                                      Commissioner of Patents